Patented Mar. 11, 1924.

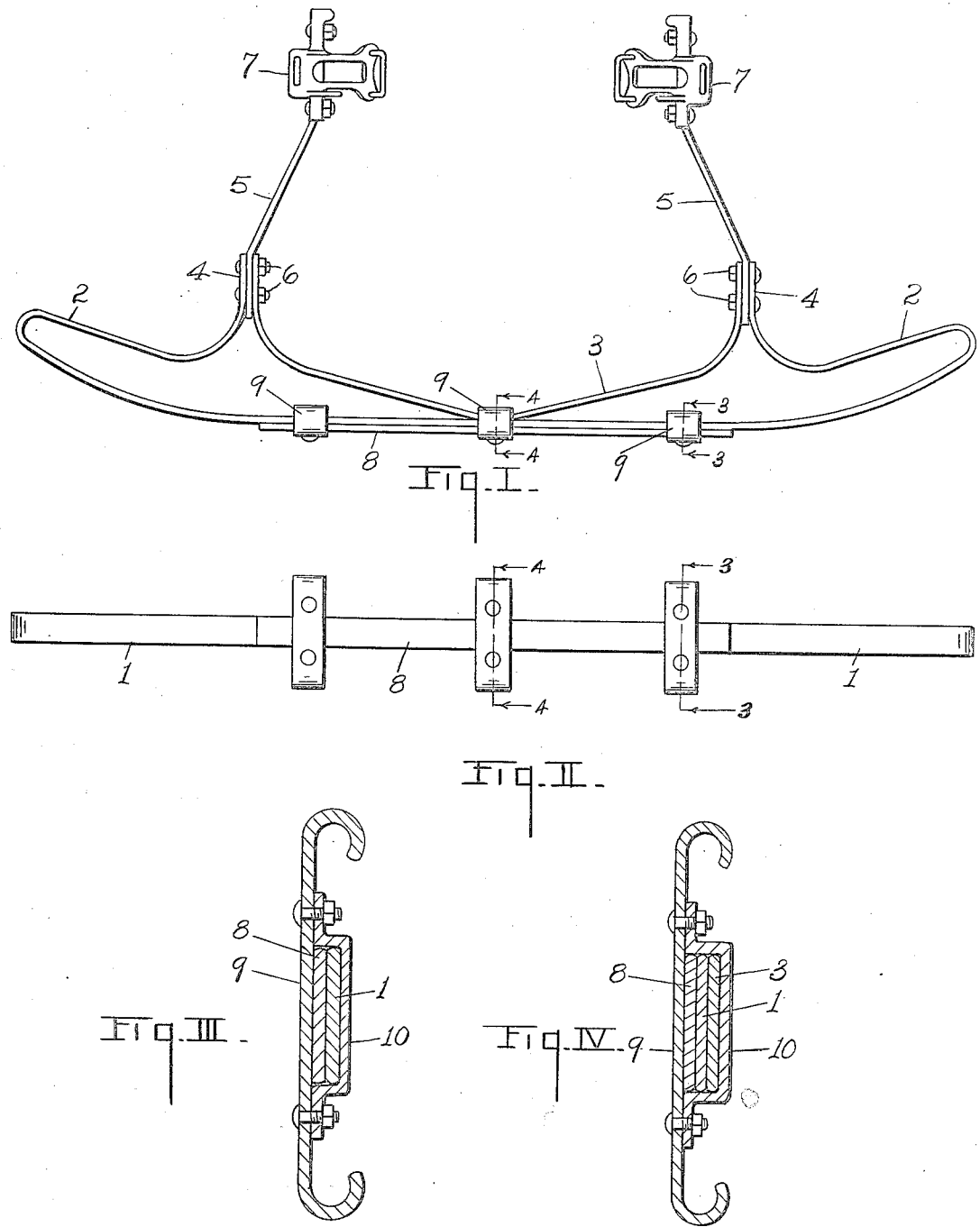

1,486,615

UNITED STATES PATENT OFFICE.

LEO H. TAFFEE, OF HASTINGS, MICHIGAN, ASSIGNOR TO HASTINGS MANUFACTURING CO., OF HASTINGS, MICHIGAN.

BUMPER.

Application filed June 7, 1923. Serial No. 643,990.

*To all whom it may concern:*

Be it known that I, LEO H. TAFFEE, a citizen of the United States, residing at Hastings, county of Barry, State of Michigan, have invented certain new and useful Improvements in Bumpers, of which the following is a specification.

This invention relates to improvements in bumpers. The main object of this invention is to provide an improved bumper which is comparatively light and economical in structure and at the same time is capable of withstanding very severe shocks and presents a bumper face of such width as to prevent the bumpers of other cars telescoping therewith in the event of collisions.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a top view of a bumper embodying the features of my invention.

Fig. II is a front elevation thereof.

Fig. III is a vertical section on a line corresponding to line 3—3 of Figs. I and II.

Fig. IV is a vertical section on a line corresponding to line 4—4 of Figs. I and II.

In the drawing similar reference characters refer to similar parts throughout the several views, and the sectional views are taken looking in the direction of the little arrows at the ends of the section lines.

Referring to the drawing, my improved bumper comprises the main horizontally disposed bar 1 having its ends bent inwardly and rearwardly at 2. The U-shaped auxiliary or reinforcing bar 3 engages the main bar at a central point, its arms projecting rearwardly in a parallel relation to the ends 4 of the main bar overlapping the forward ends of the supporting arms 5 to which they are secured by the bolts 6. The arms are provided with mounting brackets 7, the brackets illustrated being those shown in my Letters Patent No. 1,365,746 dated January 18, 1921.

A reinforcing bar 8 is superimposed upon the main bar 1 and projects a substantial distance at either side of the center thereof.

The upright bumper members 9 are superimposed upon the bar 8 and secured in position by the clips 10. These clips embrace the main bar 1 and the reinforcing bar 8, the central clip also embracing the auxiliary bar 3.

With this arrangement, the parts are effectively secured together and I provide a structure which is capable of withstanding very heavy shocks although formed of comparatively light material. I also provide a structure having a comparatively wide face, the upright bumper members preventing the telescoping of other bumpers therewith in the event of collisions as is sometimes the case where single bar bumpers are used.

Having thus described my invention, what I claim as new and desire to secure by Letters Patent, is:

1. A bumper comprising a horizontally disposed main bumper bar having its ends bent inwardly and rearwardly and a U-shaped auxiliary bar disposed at the rear of said main bar and engaging the same at a central point, supporting arms secured to the rearwardly projecting arm of the said main and auxiliary bumper bars, a reinforcing bar superimposed upon said main bumper bar to project substantial distances at each side of the center thereof, a plurality of upright bumper members, and clips for securing said upright bumper members embracing said main and reinforcing bars, the central clip embracing said auxiliary bar whereby the said upright bumper members are secured in position and said bars connected.

2. A bumper comprising a horizontally disposed main bumper bar, a reinforcing bar superimposed upon said main bumper bar to project substantial distances at each side of the center thereof, a plurality of upright bumper members, and clips for securing said upright bumper members embracing said main and reinforcing bars, whereby the said upright bumper members are secured in position and said bars connected.

In witness whereof I have hereunto set my hand and seal.

LEO H. TAFFEE. [L. S.]